(12) United States Patent
Nozawa et al.

(10) Patent No.: US 9,179,013 B2
(45) Date of Patent: Nov. 3, 2015

(54) IMAGE READING APPARATUS, AND IMAGE FORMING APPARATUS

(71) Applicant: FUJI XEROX CO., LTD., Tokyo (JP)

(72) Inventors: Eisuke Nozawa, Kanagawa (JP); Kazuaki Shintani, Kanagawa (JP)

(73) Assignee: FUJI XEROX CO., LTD., Tokyo (JP)

( * ) Notice: Subject to any disclaimer, the term of this patent is extended or adjusted under 35 U.S.C. 154(b) by 0 days.

(21) Appl. No.: 14/449,648

(22) Filed: Aug. 1, 2014

(65) Prior Publication Data

US 2015/0264196 A1 Sep. 17, 2015

(30) Foreign Application Priority Data

Mar. 11, 2014 (JP) ................. 2014-048066

(51) Int. Cl.
*H04N 1/40* (2006.01)
*H04N 1/00* (2006.01)
(52) U.S. Cl.
CPC ....... *H04N 1/00087* (2013.01); *H04N 1/00005* (2013.01); *H04N 1/00023* (2013.01)
(58) Field of Classification Search
CPC .......... H04N 1/00798; H04N 1/00814; H04N 1/00976; H04N 1/00986; H04N 1/2307; H04N 1/2346; H04N 1/40025; H04N 1/4005; H04N 1/6091; G06K 15/1276

USPC .......... 358/448, 468, 461, 1.9, 2.1; 382/273–275

See application file for complete search history.

(56) References Cited

U.S. PATENT DOCUMENTS

| 5,357,350 | A | * | 10/1994 | Matsunai | ........... 358/468 |
| 5,608,819 | A | * | 3/1997 | Ikeuchi | ........... 382/156 |
| 2009/0116080 | A1 | * | 5/2009 | Maruyama | ........... 358/475 |
| 2013/0258427 | A1 | | 10/2013 | Ito | |

FOREIGN PATENT DOCUMENTS

| JP | 02048864 A | * | 2/1990 |
| JP | 02211781 A | * | 8/1990 |
| JP | A-2013-207614 | | 10/2013 |

* cited by examiner

*Primary Examiner* — Thomas D Lee
*Assistant Examiner* — Stephen M Brinich
(74) *Attorney, Agent, or Firm* — Oliff PLC (57) ABSTRACT

Provided is an image reading apparatus including a reading member that reads a document on which an image is recorded, a calibration process section that performs a shading process to correct unevenness in brightness based on a result acquired in such a way that the reading member reads a preset color, and a heating control section that heats the reading member during a preset period when power is supplied from a state in which power is not supplied.

9 Claims, 9 Drawing Sheets

FIG. 6A
CCD OUTPUT

FIG. 6E
AFTER SHD CORRECTION

RATE OF CHANGE IN READ VALUE FOR 60 MINUTES AFTER POWER ON

|  | CCD OUTPUT [%] | AFTER SHD CORRECTION [%] |
|---|---|---|
| Y PATCH | −0.5 | 2.7 |
| M PATCH | −3.9 | 0.6 |
| C PATCH | −3.3 | 0.2 |
| WHITE PAPER | −3.6 | 0.2 |

FIG. 10

IMAGE READING APPARATUS, AND IMAGE FORMING APPARATUS

CROSS-REFERENCE TO RELATED APPLICATIONS

This application is based on and claims priority under 35 USC 119 from Japanese Patent Application No. 2014-048066 filed Mar. 11, 2014.

BACKGROUND

Technical Field

The present invention relates to an image reading apparatus, and an image forming apparatus.

SUMMARY

According to an aspect of the invention, there is provided an image reading apparatus including:

a reading member that reads a document on which an image is recorded;

a calibration process section that performs a shading process to correct unevenness in brightness based on a result acquired in such a way that the reading member reads a preset color; and a heating control section that heats the reading member during a preset period when power is supplied from a state in which power is not supplied.

BRIEF DESCRIPTION OF THE DRAWINGS

Exemplary embodiments of the present invention will be described in detail based on the following figures, wherein:

FIGS. 4A and 4B are explanatory views illustrating a heating time setting process, that is.

FIGS. 6A to 6H are explanatory views illustrating a read value of a B color imaging element, that is.

FIGS. 9A and 9B are explanatory views illustrating the change in a temperature of the imaging element while the horizontal axis indicates a temperature and the vertical axis indicates the read value of a Y patch, that is.

DETAILED DESCRIPTION

Subsequently, detailed examples (hereinafter, referred to as "examples") of exemplary embodiments of the present invention will be described with reference to the accompanying drawings. However, the present invention is not limited to the examples below.

Meanwhile, for easy understanding of descriptions below, in the drawings, forth and back directions are assumed as an X axis direction, a horizontal direction is assumed as a Y axis direction, and a vertical direction is assumed as a Z axis direction. Directions or sides which are indicated by arrows X, −X, Y, −Y, Z, and −Z are respectively assumed as a front portion, a back portion, a right portion, a left portion, an upper portion, a lower portion, or a front side, a back side, a right side, a left side, an upper side, and a lower side.

In addition, in the drawings, "O" with "•" therein means that an arrow faces from a back side to a front side of space, and "O" with "X" therein means that an arrow faces from the front side to the back side of the space.

Meanwhile, in the description below with reference to the accompanying drawings, only members which are necessary for the description are appropriately shown in the drawings for easy understanding.

First Example

Figure 1:
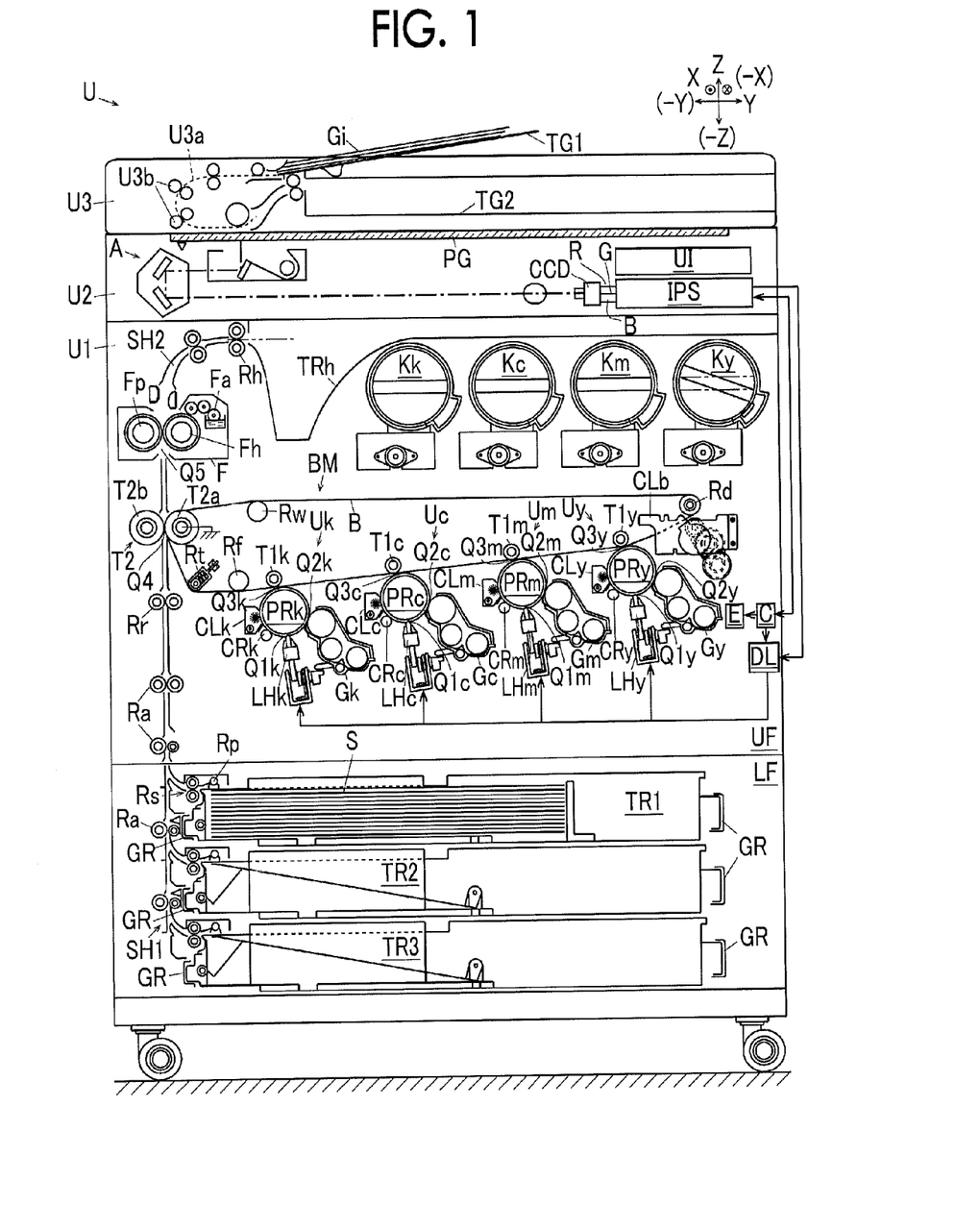
FIG. 1 is an explanatory view illustrating an entire image forming apparatus according to a first example.

FIG. 1 is an explanatory view illustrating an entire image forming apparatus according to a first example.

Figure 2:
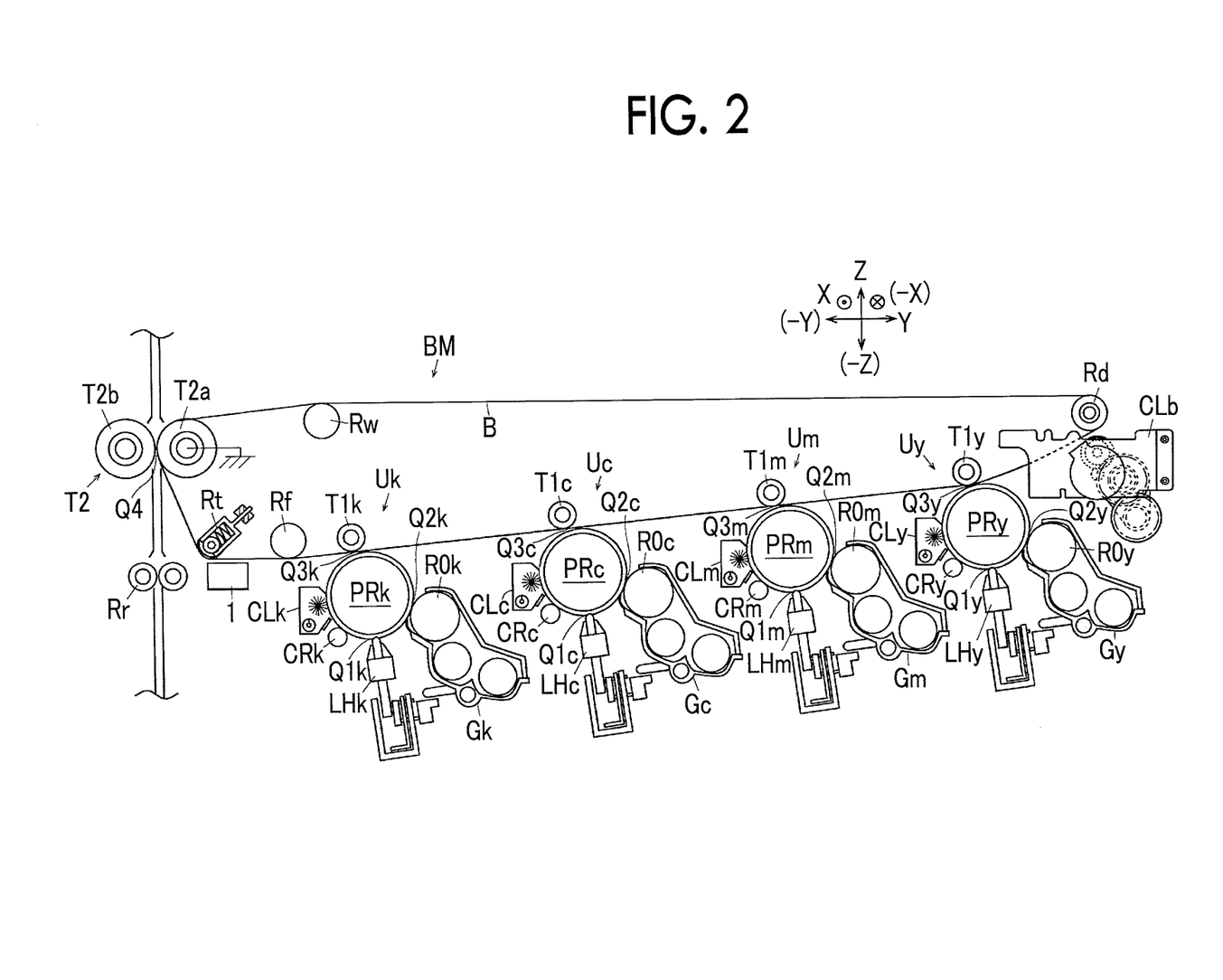
FIG. 2 is an explanatory view illustrating principal parts of the image forming apparatus according to the first example.

FIG. 2 is an explanatory view illustrating principal parts of the image forming apparatus according to the first example.

In FIG. 1, a copying machine U, which is provided as an example of an image forming apparatus according to the first example of the present invention, is an example of a recording section, and includes a printing section U1 which is provided as an example of an image recording device. On the upper portion of the printing section U1, a scanner section U2, which is an example of a reading section and is provided as an example of an image reading device, is supported. On the upper portion of the scanner section U2, an automatic feeder U3, which is provided as an example of a document transporting device, is supported. In the scanner section U2 according to the first example, a user interface UI, which is provided as an example of an input unit, is supported. The copying machine U may be operated in such a way that an operator performs input on the user interface UI.

On the upper portion of the automatic feeder U3, a document tray TG1, which is provided as an example of a medium accommodation container, is disposed. In the document tray TG1, plural documents Gi to be copied may be accommodated in piles. A document delivery tray TG2, which is provided as an example of a document discharge section, is formed in the lower portion of the document tray TG1. A document transporting roller U3b is disposed between the document tray TG1 and the document delivery tray TG2 along a document conveying path U3a.

On the upper surface of the scanner section U2, a platen glass PG, which is provided as an example of a transparent document stand, is disposed. In the scanner section U2 according to the first example, an optical reading system A is disposed in the lower portion of the platen glass PG. The optical reading system A according to the first example is movably supported in the horizontal direction along the bottom surface of the platen glass PG. Meanwhile, the optical reading system A normally stops at an initial location shown in FIG. 1.

An imaging member CCD, which is provided as an example of a reading member, is disposed in the right portion of the optical reading system A. An image processing section IPS is electrically connected to the imaging member CCD.

The image processing section IPS is electrically connected to a writing circuit DL of the printing section U1. The writing circuit DL is provided as an example of a latent image forming device, and is electrically connected to LED heads LHy, LHm, LHc, and LHk which are provided as examples of an exposure device.

The LED heads LHy, LHm, LHc, and LHk according to the first example are disposed to correspond to the respective colors Y, M, C, and K. Meanwhile, the LED heads LHy to LHk according to the first example are configured to include an LED array in which LEDs, which are provided as an example of a light emitting element, are arranged in a linear shape along the width direction of an image. The LED heads LHy to LHk are configured such that the LEDs may emit light according to an input signal. That is, the LED heads LHy to LHk are configured to be able to output the write light according to the input signal.

In FIG. 1, on the upper portions of the respective LED heads LHy to LHk, photoreceptors PRy, PRm, PRc, and PRk, which are provided as an example of an image holder, are disposed. Write areas Q1y, Q1m, Q1c, and Q1k are formed by areas in which the respective photoreceptors PRy to PRk face the respective LED heads LHy to LHk.

On the upper stream sides of the LED heads LHy to LHk with regard to the rotation direction of the respective photoreceptors PRy, PRm, PRc, and PRk, charging rollers CRy, CRm, CRc, and CRk, which are provide as an example of a charging unit, are disposed. The charging rollers CRy to CRk according to the first example come into contact with the respective photoreceptors PRy to PRk, and are supported to be driven and rotated.

On the downstream sides of the LED heads LHy to LHk with regard to the rotation directions of the photoreceptors PRy to PRk, developing devices Gy, Gm, Gc, and Gk are disposed. Developing areas Q2y, Q2m, Q2c, and Q2k are formed by areas in which the respective photoreceptors PRy to PRk face the respective developing devices Gy to Gk.

On the downstream sides of the developing devices Gy to Gk with regard to the rotation directions of the photoreceptors PRy to PRk, primary transfer rollers T1y, T1m, T1c, and T1k, which are provided as an example of a primary transfer unit, are disposed. Primary transfer areas Q3y, Q3m, Q3c, and Q3k are formed by areas in which the respective photoreceptors PRy to PRk face the respective primary transfer rollers T1y to T1k.

On the downstream sides of the primary transfer rollers T1y to T1k with regard to the rotation directions of the photoreceptors PRy to PRk, photoreceptor cleaners CLy, CLm, CLc, and CLk, which are provided as an example of an image holder cleaner, are disposed.

A Y color image forming section Uy, which is provided as an example of a Y color visible image forming device according to the first example for forming a toner image as an example of a visible image, is formed by the Y color photoreceptor PRy, the charging roller CRy, the LED head LHy, the developing device Gy, the primary transfer roller T1y, and the photoreceptor cleaner CLy. In the same manner, respective M, C, and K color image forming sections Um, Uc, and Uk are formed by the photoreceptors PRm, PRc, and PRk, the charging rolls CRm, CRc, and CRk, the LED heads LHm, LHc, and LHk, the developing devices Gm, Gc, and Gk, the primary transfer rollers T1m, T1c, and T1k, and the photoreceptor cleaners CLm, CLc, and CLk.

On the upper portion of the photoreceptors PRy to PRk, a belt module BM, which is provided as an example of an intermediate transfer device, is disposed. The belt module BM is an example of an image holder, and includes an intermediate transfer belt B which is provided as an example of an intermediate transfer body. The intermediate transfer belt B is configured to include an endless belt member.

The intermediate transfer belt B according to the first example is rotatably supported by a belt drive roller Rd which is provided as an example of a drive member, a tension roller Rt which is provided as an example of a stretching member, a walking roller Rw which is provided as an example of a deviation correcting member, an idler roll Rf which is provided as an example of a driven member, a backup roller T2a which is provided as an example of a secondary transfer area facing member, and the primary transfer rollers T1y, T1m, T1c, and T1k.

A secondary transfer roller T2b, which is provided as an example of a secondary transfer member, is disposed in a location in which the secondary transfer roller T2b faces the backup roller T2a while interposing the intermediate transfer belt B therebetween. In the first example, the backup roller T2a is grounded, and a secondary transfer voltage having a polarity reverse to a toner charging polarity is applied to the secondary transfer roller T2b from a power supply circuit E. A secondary transfer unit T2 according to the first example is configured to include the backup roller T2a and the secondary transfer roller T2b. In addition, the secondary transfer area Q4 is configured to include an area in which the secondary transfer roller T2b comes into contact with the intermediate transfer belt B.

On the downstream side of the secondary transfer area Q4 with regard to the rotation direction of the intermediate transfer belt B, a belt cleaner CLb, which is provided as an example of an intermediate transfer body cleaner, is disposed.

A transfer device T1+T2+B according to the first example is configured to include the primary transfer rollers T1y to T1k, the intermediate transfer belt B, and the secondary transfer unit T2. In addition, an image recording section Uy to Uk+T1+T2+B according to the first example is configured to include the image forming sections Uy to Uk and the transfer device T1+T2+B.

In FIG. 1, a pair of right and left guide rails GR, which are provided as an example of a guide member, is provided in three stages in the lower portion of the image forming sections Uy to Uk. In the respective guide rails GR, paper feeding trays TR1 to TR3, which are provided as an example of a medium accommodation section, are supported to be able to enter and leave in back and forth directions. In the paper feeding trays TR1 to TR3, recording sheet S, which is provided as an example of a medium, is accommodated.

A pick up roller Rp, which is provided as an example of a fetch member, is disposed on the upper right portion of each of the paper feeding trays TR1 to TR3. A handling roller Rs, which is provided as an example of a handling member, is disposed on the downstream side of the pickup roller Rp with regard to the conveyance direction of the recording sheet S. A paper feeding path SH1, which is provided as an example of a medium conveying path and which extends toward the upper portion thereof, is formed on the downstream side of the handling roller Rs with regard to the conveyance direction of the recording sheet S. Plural transporting rollers Ra, which are provided as an example of a conveyance member, are disposed along the paper feeding path SH1.

A register roller Rr, which is provided as an example of a conveyance time adjustment member, is disposed on the upper stream side of the secondary transfer area Q4 along the paper feeding path SH1.

A fixing device F is disposed on the downstream side of the secondary transfer area Q4 with regard to the conveyance direction of the sheet S. The fixing device F includes a heating roller Fh which is provided as an example of a fixing member for heating, and a pressurization roller Fp which is provided as an example of a fixing member for pressurization. A fixing area Q5 is configured to include a contact area of the heating roller Fh and the pressurization roller Fp.

A paper ejection path SH2, which is provided as an example of a conveying path, is disposed in the upper portion of the fixing device F. A document delivery tray TRh, which is provided as an example of a medium discharge section, is formed on the upper surface of the printing section U1. The paper ejection path SH2 extends toward the document delivery tray TRh. A paper ejection roller Rh, which is provided as a medium conveyance member, is disposed at the downstream end of the paper ejection path SH2.

Image Forming Operation

If a copying operation starts in the copying machine U, which includes the configuration, according to the first example, the plural documents Gi which are accommodated in the document tray TG1 sequentially pass through a document reading location on the platen glass PG, and are discharged to the document delivery tray TG2.

When the documents are automatically conveyed and copied using the automatic feeder U3, each of the documents Gi, which sequentially pass through the reading location on the platen glass PG, is exposed in a state in which the optical reading system A stops in the initial location. When an operator performs copying while placing the document Gi on the platen glass PG by hand, the optical reading system A moves in the horizontal direction and the document on the platen glass PG is exposed and scanned.

Light reflected from the document Gi is condensed to the imaging member CCD through the optical system A. The imaging member CCD converts light reflected from the document Gi, which is condensed to an imaging surface, into an electrical signal.

The electrical signal, which is output from the imaging member CCD, is input to the image processing section IPS. The image processing section IPS converts the electrical signal of an RGB color image which is read by the imaging member CCD into image information of yellow Y, magenta M, cyan C, and black K for forming a latent image. The image processing section IPS outputs the image information, acquired after conversion, to the writing circuit DL of the printing section U1. Meanwhile, when the image is a single color image, so called, a monochrome, the image processing section IPS outputs only black K image information to the writing circuit DL.

The writing circuit DL outputs a control signal based on the input image information to the LED heads LHy to LHk. The LED heads LHy to LHk output writing light based on the control signal.

When images start to be formed, each of the photoreceptors PRy to PRk performs rotary driving. A charged voltage is applied to the charging rollers CRy to CRk from the power supply circuit E. Therefore, the surfaces of the photoreceptors PRy to PRk are charged by the charging rollers CRy to CRk. Electrostatic latent images are formed on the surfaces of the charged photoreceptors PRy to PRk in the writing areas Q1$y$ to Q1$k$ by the writing light from the LED heads LHy to LHk. The electrostatic latent images of the photoreceptors PRy to PRk are developed as toner images, which are provided as an example of a visible image, by the developing devices Gy, Gm, Gc, and Gk in the developing areas Q2$y$ to Q2$k$.

The developed toner images are conveyed to the primary transfer areas Q3$y$, Q3$m$, Q3$c$, and Q3$k$ which come into contact with the intermediate transfer belt B. In the primary transfer areas Q3$y$, Q3$m$, Q3$c$, and Q3$k$, the primary transfer voltage having a polarity reverse to the toner charging polarity is supplied to the primary transfer rollers T1$y$ to T1$k$ from the power supply circuit E. Therefore, the toner images on the respective photoreceptors PRy to PRk are transferred to the intermediate transfer belt B by the primary transfer rollers T1$y$ to T1$k$. Meanwhile, in a case of multi-color toner images, the toner images on the downstream side are transferred on the toner images which have been transferred on the intermediate transfer belt B in the primary transfer area on the upstream side in superimposed manner.

Residuals and attached substances of the photoreceptors PRy to PRk after the primary transfer is performed are cleaned by the photoreceptor cleaners CLy to CLk. The cleaned surfaces of the photoreceptors PRy to PRk are charged again by the charging rollers CRy to CRk.

The single color toner images or the multi-color toner images which are transferred to the intermediate transfer belt B by the primary transfer rollers T1$y$ to T1$k$ in the primary transfer areas Q3$y$ to Q3$k$ are conveyed to the secondary transfer area Q4.

The sheet S on which images are recorded is fetched by the pickup roller Rp of the paper feeding trays TR1 to TR3, which is used. When plural pieces of sheet S are fetched in piles, the pieces of sheet S which are fetched by the pickup roller Rp are separated one by one by the handling roller Rs. The pieces of sheet S which are separated by the handling roller Rs are conveyed along the paper feeding path SH1 by the transporting roller Ra. The pieces of sheet S which are conveyed along the paper feeding path SH1 are sent to the register roller Rr.

The register roller Rr conveys the sheet S to the secondary transfer area Q4 in accordance with a time in which the toner images formed on the intermediate transfer belt B are conveyed to the secondary transfer area Q4. The secondary transfer voltage having a polarity reverse to the toner charging polarity is applied to the secondary transfer roller T2$b$ by the power supply circuit E. Therefore, the toner images on the intermediate transfer belt B are transferred from the intermediate transfer belt B to the sheet S.

After the secondary transfer is performed, the attached substances or the like, which are attached to the surface of the intermediate transfer belt B, are cleaned by the belt cleaner CLb.

The recording sheet S, to which the toner images are secondary transferred, is heated and fixed when the recording sheet S passes through the fixing area Q5.

The recording sheet S, to which the images are fixed, is conveyed along the paper ejection path SH2. The sheet S, which is conveyed along the paper ejection path SH2, is discharged to the document delivery tray TRh by the paper ejection roller Rh.

Reading Member

Figure 3:
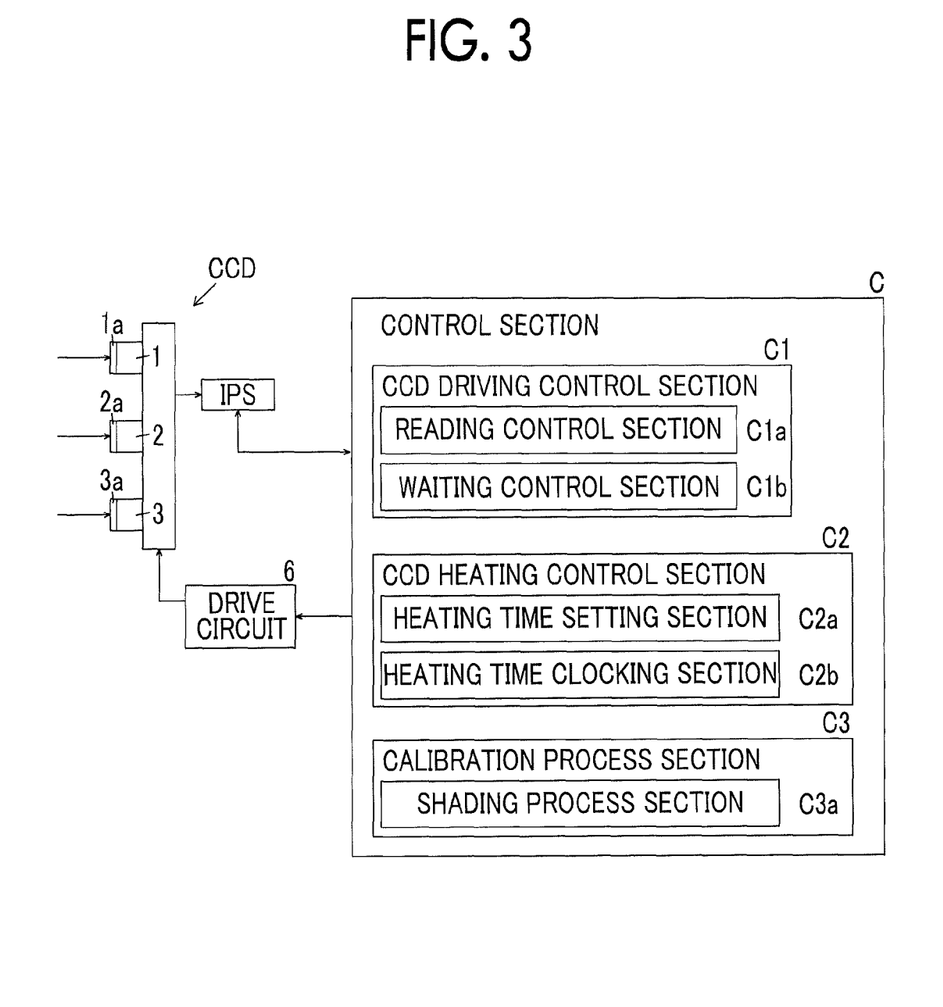
FIG. 3 is an explanatory view illustrating a reading member according to the first example.

FIG. 3 is an explanatory view illustrating the reading member according to the first example.

In FIG. 3, the imaging member CCD according to the first example includes a reading element 1 which reads the red color component of an image of the document Gi, a reading element 2 which reads the green color component of the image of the document Gi, and a reading element 3 which reads the blue color component of the image of the document Gi. A red color reading element 1 reads the image of the document Gi through a red filter 1a which is provided as an example of a transmission member for transmitting R: red color light. A green color reading element 2 reads the image of the document Gi through a green filter 2a which is provided as an example of a transmission member for transmitting G: green color light. A blue color reading element 3 reads the image of the document Gi through a blue filter 3a which is provided as an example of a transmission member for transmitting B: blue color light.

Power is supplied and a control signal is input to the imaging member CCD according to the first example from a drive circuit 6. In the first example, in a state in which power is not supplied to the copying machine U or a power saving state, that is, in a so-called energy saving mode or sleeping mode, electricity is not supplied to the imaging member CCD. In addition, in a state in which an operation such as a reading operation is performed, a drive voltage V1 is supplied to the imaging member CCD. Further, in a state in which the reading operation is not performed while not being in the power saving state, that is, a so-called stand-by state or waiting state, a waiting voltage V2 is supplied to the imaging member CCD. In the first example, as an example, the drive voltage V1 is set to 10[V] and the waiting voltage V2 is set to 7[V].

Meanwhile, in the first example, a white reference plate, which is provided as an example of a reference member which is not shown in the drawing, is disposed along the document conveying path U3a. The surface of the white reference plate is configured to include a white color having a preset concentration.

Control Section C

In FIG. 3, the imaging member CCD according to the first example transmits and receives a signal between the control section C of the copying machine U and the imaging member CCD. The control section C according to the first example includes an I/O that includes a small-sized information processing device, that is, a so-called microcomputer, that inputs and outputs a signal from and to the outside, and that adjusts an input/output signal level, a ROM that stores a program and data to perform a necessary process, a RAM or an HDD that temporally stores necessary data, a CPU that performs a process according to the program which is stored in the ROM or the HDD, and a computer that is provided as an example of a calculator which includes a clock generator and the like. The control section C may implement various functions by performing the program which is stored in the ROM.

The control section C includes the following functional sections C1 to C3.

A CCD driving control section C1, which is provided as an example of the drive control section of the reading member, includes a reading control section C1a and a waiting control section C1b, and controls the imaging member CCD through the drive circuit 6. Meanwhile, the CCD driving control section C1 stops supplying power to the imaging member CCD in a case of power off and in the power saving state.

The reading control section C1a supplies the drive voltage V1 to the imaging member CCD when the document Gi is read.

The waiting control section C1b supplies the waiting voltage V2 to the imaging member CCD in the case of standing by in which the document Gi is not read.

The CCD heating control section C2, which is provided as an example of the heating control section of the reading member, includes a heating time setting section C2a and a heating time clocking section C2b. The CCD heating control section C2 according to the first example heats the imaging member CCD by causing the imaging member CCD to be in an operation state during a preset time t1 when power is supplied from a state in which power is not supplied. The CCD heating control section C2 according to the first example causes the imaging member CCD to be in the operation state during the heating time t1 when power is supplied and when the CCD returns from the power saving state, thereby heating the imaging member CCD up to a temperature at which the results of reading of the document Gi by the imaging member CCD is stable. More specifically, the CCD heating control section C2 according to the first example supplies the drive voltage V1 to the imaging member CCD during the heating time t1 when power is supplied and when the CCD returns from the power saving state.

Figure 4A:
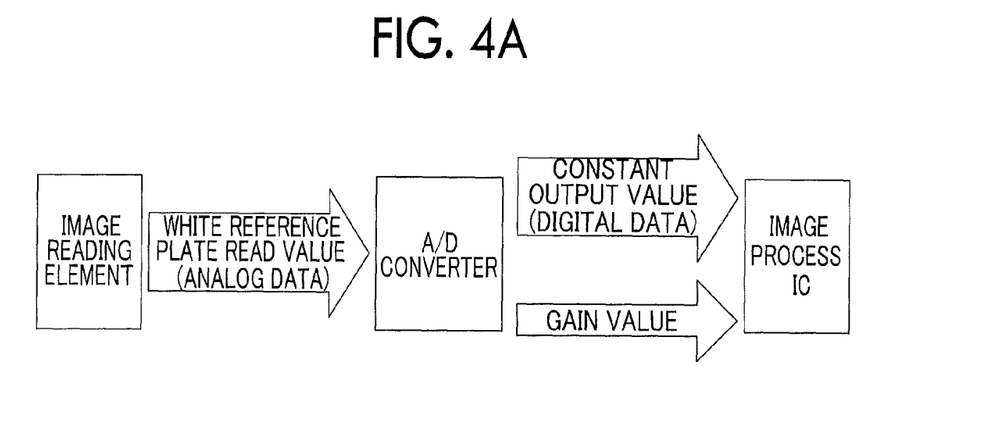
FIG. 4A is an explanatory view illustrating the outline of the process.
Figure 4B:
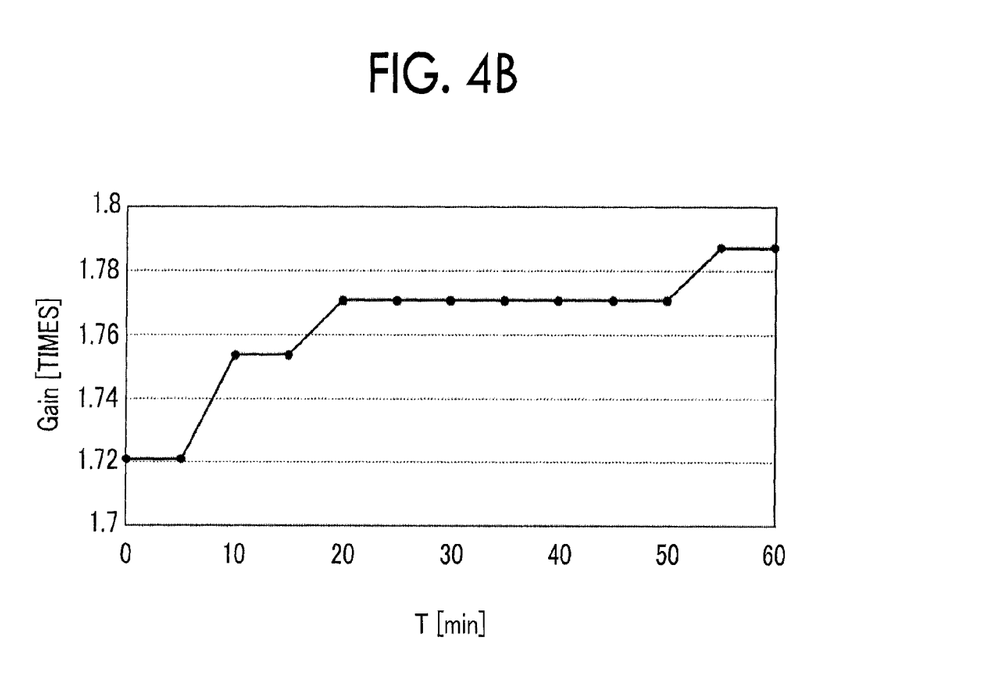
FIG. 4B is an explanatory view illustrating results of an experiment with regard to an elapsed time from when power is supplied and the change in a gain value.

FIGS. 4A and 4B are explanatory views illustrating a heating time setting process, that is, FIG. 4A is a schematic explanatory view illustrating the process and FIG. 4B is an explanatory view illustrating results of an experiment with regard to an elapsed time from when power is supplied and the change in a gain value.

A heating time setting section C2a, which is provided as an example of a period setting section, sets the heating time t1, in which the imaging member CCD is caused to be in the operation state, based on reading results acquired by reading a white color reference plate. The heating time setting section C2a according to the first example sets the heating time t1 based on the reading results of the white color reference plate using the imaging member CCD when power is supplied or when the CCD returns from the power saving state. More specifically, when conversion is performed on an analog data read value, acquired by reading the white color reference plate using the imaging member CCD in the case in which power is supplied or the like, using an analog/digital converter (A/D converter), a gain is set so that an output value of digital data is constant. As shown in FIGS. 4A and 4B, it is experimentally recognized that the gain value rises in accordance with the temperature of the imaging member CCD sequentially rising in a state in which only the waiting voltage V2 is supplied to the imaging member CCD.

Accordingly, the heating time setting section C2a sets the time t1, which is necessary until the imaging member CCD is stable, by comparing a gain value, which is set when the A/D conversion is performed, and a previously measured gain value in a state in which the imaging member CCD is stable. In the first example, the heating time t1 is set by comparing the gain value (=1.77), acquired when 30 minutes, during which the reading of the imaging member CCD is relatively stable, elapse and a gain value which is set when A/D conversion is performed. As an example, when the gain value=1.72 in a case of 0 minutes and when the gain value, which is set in the case of A/D conversion, is x such that the heating time t1 has the maximum value 5 [minutes], t1 is derived by the following Equation 1.

$$t1=-100 \times x+177 \quad (1)$$

Meanwhile, the exemplary embodiment is not limited to the configuration in which the heating time t1 is set based on the gain value as in the first example. For example, a configuration may be provided in which the temperature of the imaging member CCD is measured using a temperature sensor and the heating time t1 is set. In addition, the heating time t1 is not limited to a variable numerical value, and may be set to a fixed time, for example, five minutes.

The heating time clocking section C2b clocks the heating time t1. The heating time clocking section, that is, a timer TM1 starts to clock the heating time t1 when power is supplied or when returning from the power saving state.

A calibration process section C3, which is provided as an example of a calibration process section, includes a shading process section C3a, and performs a calibration process, which is provided as an example of the calibration process, based on results acquired by reading a calibration chart, which is provided as an example of a document for preset calibration, using the imaging member CCD. When the start of the calibration process is input, the calibration process section C3 according to the first example prints the calibration chart recorded with a calibration image which is provided as an example of an image for calibration, which includes plural preset color images, so-called patch images. Further, the operator places the calibration chart on the platen glass PG or sets an automatic feeder U3, and thus the calibration chart is read by the imaging member CCD. Further, calibration is performed on each of numerical values, acquired when the image processing is processed, based on an image, which has a preset concentration and the location which are recorded in the calibration chart, and deviation between an actually read concentration or the like. Meanwhile, the calibration chart according to the first example includes patch images which have plural preset concentrations with regard to the respective colors Y, M, C, and K.

The shading process section C3a, which is provided as an example of a brightness correction section, performs a shading process to perform correction such that the luminance and unevenness in brightness of each of the imaging elements 1 to 3 become uniform in brightness. The shading process section C3a according to the first example reads the white color reference plate from each of the imaging elements 1 to 3, and performs correction such that the unevenness in brightness of each of the imaging elements 1 to 3 is uniform based on the results of the reading.

Meanwhile, since the shading process and the calibration process are the well-known related art, the detailed description thereof will be omitted.

Flowchart According to First Example

Subsequently, the flow of control performed on the copying machine U according to the first example will be described using a so-called flowchart.

Flowchart of Heating Process

Figure 5:
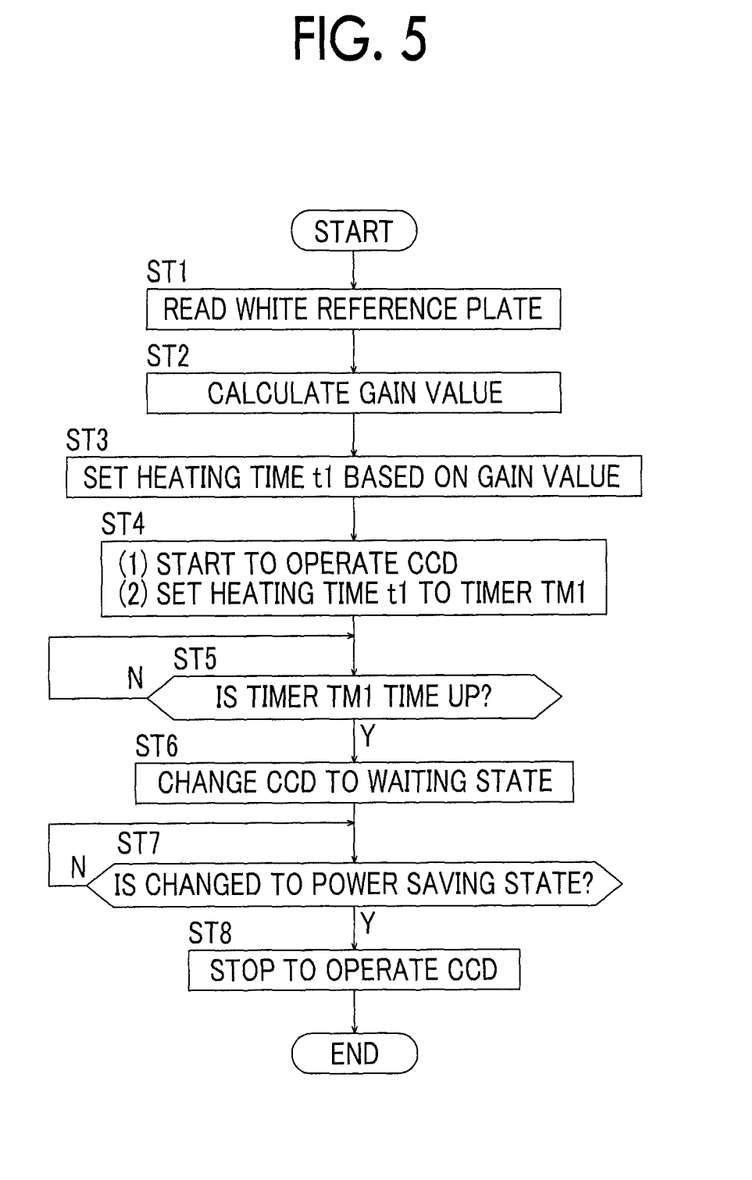
FIG. 5 is an explanatory view illustrating a heating process according to the first example.

FIG. 5 is an explanatory view illustrating the heating process according to the first example.

A process in each step ST of the flowchart of FIG. 5 is performed according to a program which is stored in the control section C of the copying machine U. In addition, the process is performed in parallel with other various processes of the copying machine U. Meanwhile, processes to supply the drive voltage V1 to the imaging member CCD when the reading process starts and to supply the waiting voltage V2 when the reading process is terminated, and a process to proceed to the power saving state when a preset time elapses in a state in which any input or process is not performed are simple, and thus the descriptions of the processes are omitted.

The flowchart shown in FIG. 5 starts when the power is supplied to the copying machine U or the copying machine U returns from the power saving state.

In ST1 of FIG. 5, the white color reference plate is read by the imaging member CCD. Further, the process proceeds to ST2.

In ST2, the gain value is calculated by performing the A/D conversion. Further, the process proceeds to ST3.

In ST3, the heating time t1 is set based on the gain value. Further, the process proceeds to ST4.

In ST4, subsequent processes (1) and (2) are performed, and the process proceeds to ST5.

(1) The imaging member CCD is operated. That is, the drive voltage V1 is supplied to the imaging member CCD.

(2) The heating time t1 is set to the clocking section TM1.

In ST5, it is determined whether or not the clocking section TM1 time is up. That is, it is determined whether or not the heating time t1 elapse. In a case of YES (Y), the process proceeds to ST6. In a case of No (N), the process in ST5 is repeated.

In ST6, the imaging member CCD is changed to the waiting state. That is, the waiting voltage V2 is supplied to the imaging member CCD. Further, the process proceeds to ST7.

In ST7, it is determined whether or not the imaging member CCD is changed to the power saving state. In a case of YES (Y), the process proceeds to ST8. In a case of No (N), the process in ST7 is repeated.

In ST8, the operation of the imaging member CCD stops. That is, the supply of the voltage to the imaging member CCD stops. Further, the heating process is terminated.

Operation of Image Reading Apparatus

In the scanner section U2 which includes the configuration according to the first example, the drive voltage V1 is supplied when power is supplied or the scanner section returns from the power saving state and when the imaging member CCD is in the heating time t1. Accordingly, the imaging member CCD is maintained in a state in which electricity is conducted, and thus the temperature rises. Therefore, after power is supplied, the temperature of the imaging member CCD is quickly raised compared to a configuration of the related art in which the waiting voltage V2 is supplied. Accordingly, the results of reading of the imaging member CCD are stable. Therefore, compared to the related art, the calibration process may be quickly started, and a time until the calibration process is started may be reduced.

Figure 6A:
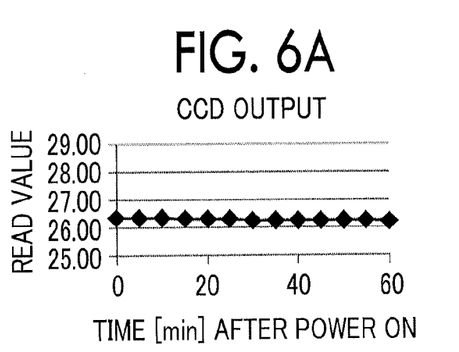
FIG. 6A is an explanatory view illustrating a read value when a Y color patch image is read.
Figure 6B:
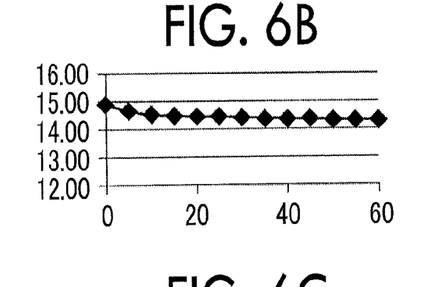
FIG. 6B is an explanatory view illustrating a read value when an M color patch image is read.
Figure 6C:
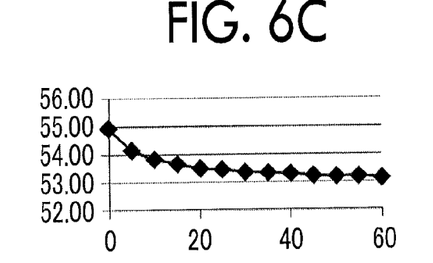
FIG. 6C is an explanatory view illustrating a read value when a C color patch image is read.
Figure 6D:
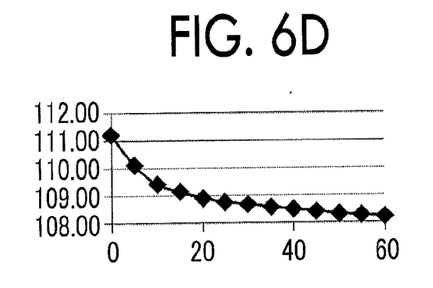
FIG. 6D is an explanatory view illustrating a read value when white color paper is read.
Figure 6E:
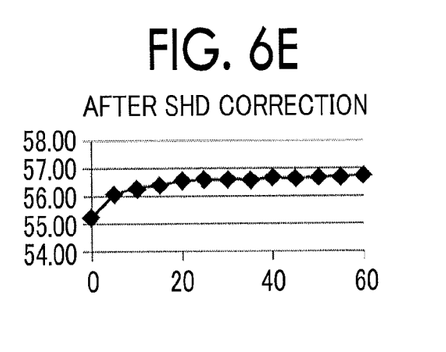
FIG. 6E is an explanatory view illustrating a read value of the Y color image after shading correction is performed based on a white color.
Figure 6F:
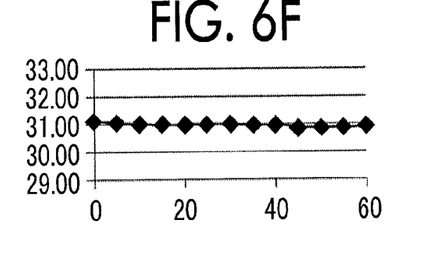
FIG. 6F is an explanatory view illustrating a read value of the M color image after the shading correction is performed based on the white color.
Figure 6G:
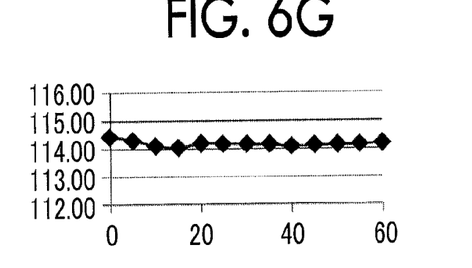
FIG. 6G is an explanatory view illustrating a read value of the C color image after the shading correction is performed based on the white color.
Figure 6H:
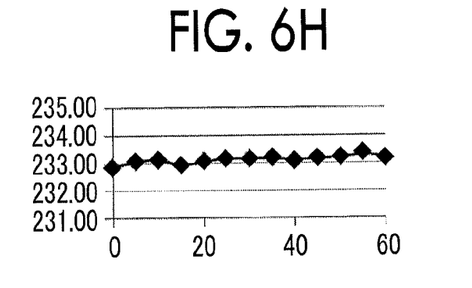
FIG. 6H is an explanatory view illustrating a read value of the white color image after the shading correction is performed based on the white color.

FIGS. 6A to 6H are explanatory views illustrating a read value of a B color imaging element, that is, FIG. 6A is an explanatory view illustrating a read value when a Y color patch image is read, FIG. 6B is an explanatory view illustrating a read value when an M color patch image is read, FIG. 6C is an explanatory view illustrating a read value when a C color patch image is read, FIG. 6D is an explanatory view illustrating a read value when white color paper is read, FIG. 6E is an explanatory view illustrating a read value of the Y color image after shading correction is performed based on a white color, FIG. 6F is an explanatory view illustrating a read value of the M color image after the shading correction is performed based on the white color, FIG. 6G is an explanatory view illustrating a read value of the C color image after the shading correction is performed based on the white color, and FIG. 6H is an explanatory view illustrating a read value of the white color image after the shading correction is performed based on the white color. Meanwhile, in FIGS. 6A to 6H, the horizontal axis indicates a time from when power is supplied, and the vertical axis indicates the magnitude of the value, that is, brightness.

Meanwhile, FIGS. 6A to 6H illustrate results of measurements performed every 5 minutes in a state in which the waiting voltage V2 is continuously supplied to the B color imaging element 3 and the temperature is sequentially raised. Meanwhile, the drive voltage V1 is supplied only when the measurement is performed.

Figure 7:
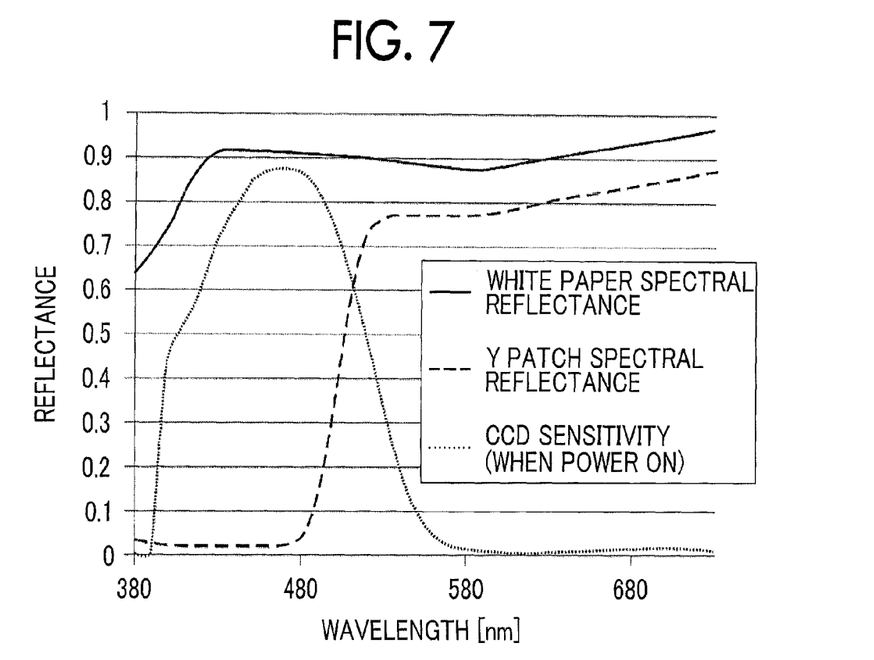
FIG. 7 is an explanatory view illustrating results of an experiment with regard to the reflectance characteristics of the B color imaging element, that is, a graph in which a horizontal axis indicates a wavelength and a vertical axis indicates reflectance.

FIG. 7 is an explanatory view illustrating results of an experiment with regard to the reflectance characteristics of the B color imaging element, and a graph in which a horizontal axis indicates a wavelength and a vertical axis indicates reflectance.

Meanwhile, FIG. 7 illustrates results acquired by measuring the CCD sensitivity when power is supplied (elapsed time 0 minutes).

Figure 8:
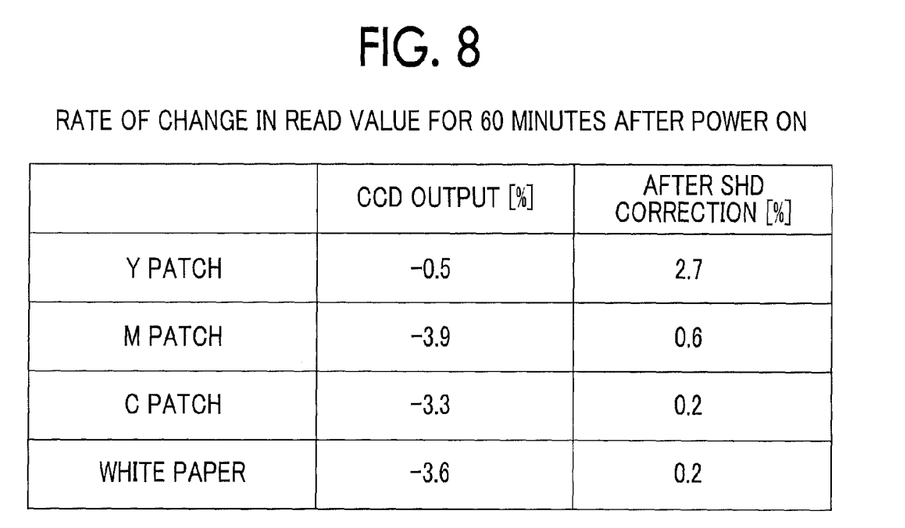
FIG. 8 is a table in which the results of the experiment in FIGS. 6A to 6H are gathered, that is, an explanatory view illustrating the rate of change in the read value of the B color imaging element acquired when power is supplied and after 60 minutes elapse.

FIG. 8 is a table in which the results of the experiment in FIGS. 6A to 6H are gathered, that is, an explanatory view illustrating the rate of change in the read value of the B color imaging element acquired when power is supplied and after 60 minutes elapse.

In FIGS. 6A to 6H, when the shading correction is performed, brightness is corrected to be uniform using the white color reference plate. At this time, as shown in FIG. 6A, it is understood that the B color imaging element 3 has a low read value for the Y color image (Y patch) and hardly receives influence with regard to the change in the temperature of the imaging element 3 before the shading correction is performed. The reason for this is that the reflectance of the Y patch is low in a B color sensitivity area in the vicinity of 450 nm, as shown in FIG. 7. In contrast, as shown in FIG. 7, the white color paper has high reflectance in the B color sensitivity area (in the vicinity of 450 nm), thereby being easily affected by change in the CCD sensitivity. Accordingly, as shown in FIG. 6D, the change in the read value is generated in accordance with the temperature of the CCD. In shading correction which has been performed from the related art, the output value of the imaging element 3 is corrected as shown in FIG. 6H based on the white color shown in FIG. 6D.

However, if correction as shown in FIG. 6H is performed, the read output of the Y patch, which has low sensitivity as shown in FIG. 6A, is corrected to a value acquired by greatly receiving the change in the white color read value after the shading correction is performed as shown in FIG. 6E. Accordingly, as shown in FIG. 8, if the shading correction is performed immediately after power is supplied in a state in which the 60 minutes elapse and the sensitivity of the imaging element 3 is stable, the output value, acquired after Y patch shading correction is performed, is greatly deviated compared to other colors. That is, as a result, the Y patch has a state in which the shading correction is not sufficient with regard to the B color imaging element 3.

Accordingly, if high-precision calibration correction, including the shading correction, is performed immediately after power is supplied, correction is not sufficient, and thus there is a problem in that reading accuracy is low. Therefore, in the related technology, when high-precision calibration correction, including the shading correction, is performed, the calibration correction is performed after the sensitivity of the imaging member CCD is stable. That is, as read from the graphs in FIGS. 6D and 6E, the calibration correction is performed after waiting approximately 30 minutes in which the read value is saturated and stable.

Accordingly, in the related technology, it is difficult to perform the calibration correction immediately after power is supplied, and thus there is a problem in that it is difficult to perform high-precision calibration correction without waiting approximately 30 minutes, and that time is taken.

Figure 9A:
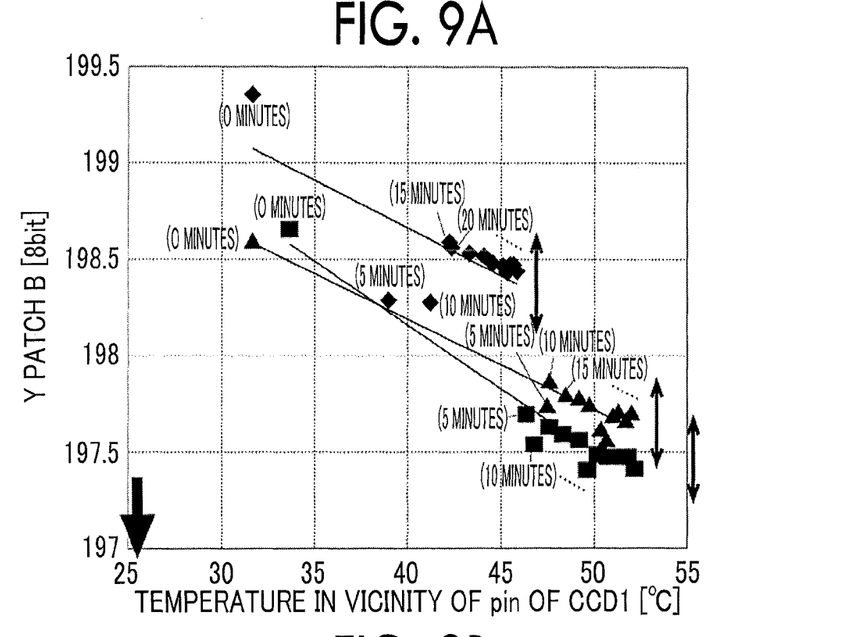
FIG. 9A is an explanatory view illustrating the change in the temperature of the imaging element in a configuration according to the first example.
Figure 9B:
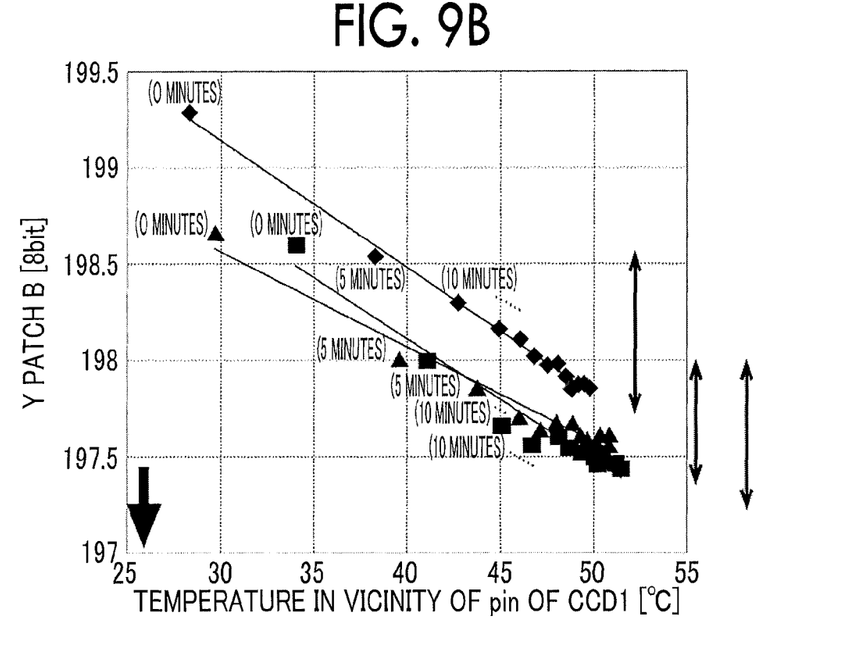
FIG. 9B is an explanatory view illustrating the change in the temperature in a configuration according to the related art.

FIGS. 9A and 9B are explanatory views illustrating the change in the temperature of the imaging element while the horizontal axis indicates the temperature and the vertical axis indicates the read value of a Y patch, that is, FIG. 9A is an explanatory view illustrating the change in the temperature in a configuration according to the first example, and FIG. 9B is an explanatory view illustrating the change in the temperature in a configuration according to the related art.

Figure 10:
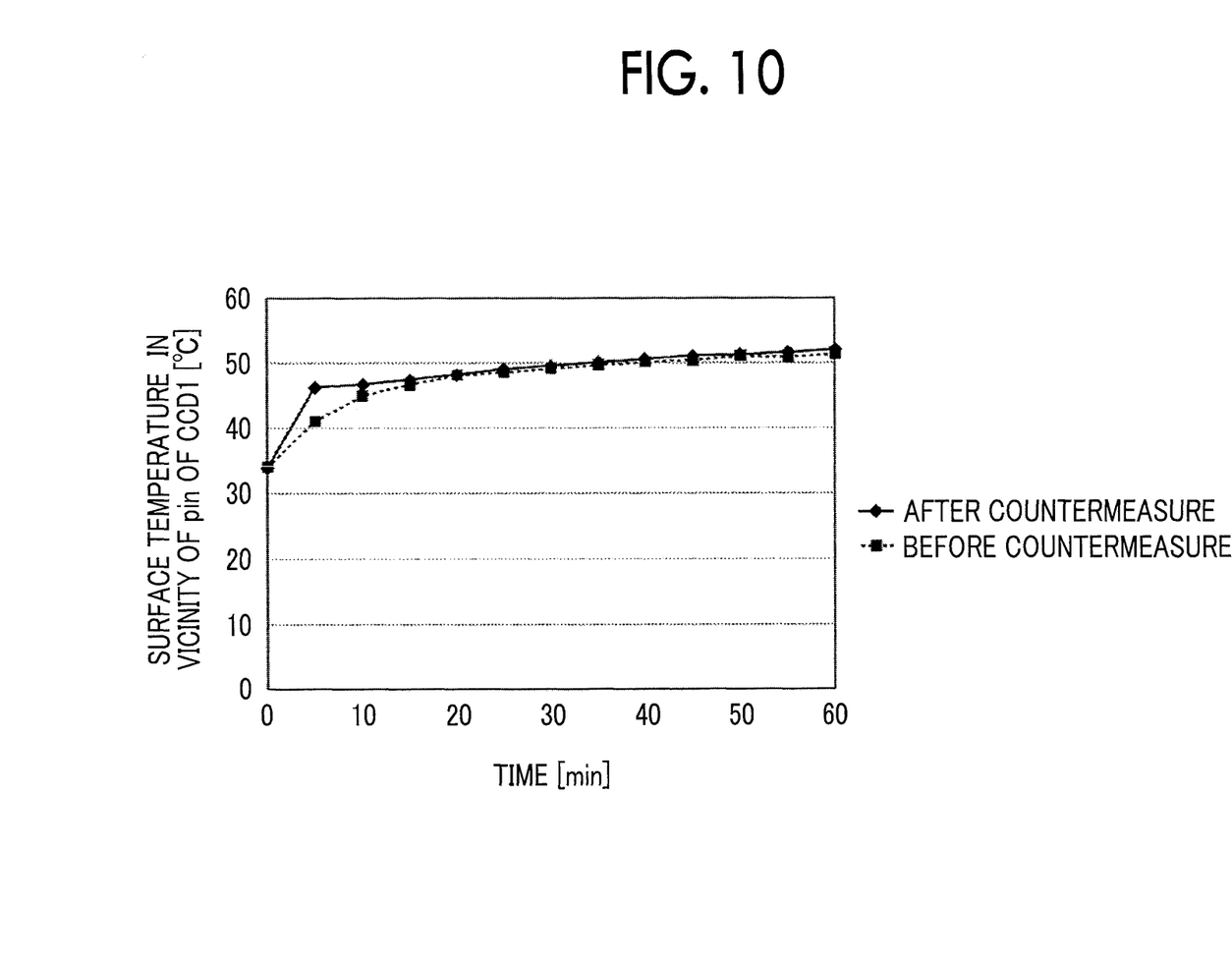
FIG. 10 is an explanatory view illustrating the change in the temperature of an entity in a configuration according to the first example in FIGS. 9A and 9B and the change in the temperature according to the related art configuration.

FIG. 10 is an explanatory view illustrating the change in the temperature of an entity in a configuration according to the first example illustrated in FIGS. 9A and 9B and the change in the temperature according to the related art configuration.

Meanwhile, in measurements in FIGS. 9A, 9B, and 10, the heating time t1 is fixed to 5 minutes for convenience.

In FIGS. 9A, 9B, and 10, changes in the temperature, acquired when control which is the same as in the related art technology is performed and control according to the first example is performed on three B color imaging elements 3 (entity 1, entity 2, and entity 3), are recognized. As in the related art technology, in a configuration in which the waiting voltage V2 is continuously supplied without heating the imaging member, the temperature sequentially rises but it takes approximately at least 20 minutes until the temperature reaches a temperature at which the sensitivity is saturated, as shown in FIGS. 9B and 6E. Accordingly, when space, that is, so-called margin is taken into consideration, it is necessary to wait for approximately 30 minutes until the calibration correction starts as in the related art technology.

In contrast, as in the first example, even in a state in which reading is not performed, if the drive voltage V1 is supplied for the heating time t1 when power is supplied or when returning from the power saving state, the temperature almost rises up to a temperature, at which the sensitivity of the imaging element 3 is stable, after five minutes. Accordingly, in the configuration according to the first example, high-precision calibration correction may be performed at five minutes after power is supplied or after returning from the power saving state. Accordingly, in the first example, a time required before the calibration correction is performed may be greatly reduced compared to the related art.

In addition, in the scanner section U2 according to the first example, the heating time t1 is set based on the gain value. That is, the gain value is a value which changes in synchronization with the read value, and is synchronized with the temperature of the imaging element 3. Accordingly, the minimum heating time t1, which is necessary until the temperature reaches a desired temperature, is set based on the temperature of the imaging element 3 acquired when power is supplied. Accordingly, the supply of unnecessary drive voltage V1 for a long period is suppressed. Therefore, unnecessary power consumption is suppressed and the lifetime of the imaging element 3 is suppressed from being short.

Further, in the scanner section U2 according to the first example, the drive voltage V1 is supplied as a method of heating the imaging element 3. Accordingly, additional configurations are not necessary, compared to a configuration in which a heat source or a heater is installed as the method of heating the imaging element 3. Therefore, additional cost increase is suppressed. In addition, the drive voltage V1 is supplied when the imaging element 3 is operated, and thus unreasonable heating is not performed in the imaging element 3. Therefore, a case in which the life of the imaging element 3 is shortened is reduced.

Modification Example

Hereinabove, the example of the present invention is described. However, the present invention is not limited to the example and various modifications are possible without departing from the gist of the present invention disclosed in claims. Modification examples (H01) to (H03) of the present invention are shown below.

(H01) In the example, the copying machine U is illustrated as an example of the image forming apparatus but the present invention is not limited thereto and may be applied to a printer, a FAX, or a composite machine which includes the functions thereof. In addition, the configuration in which Y, M, C, and K, that is, a four-color image may be formed is shown as an example. However, the present invention is not limited thereto. The present invention may be applied to an image forming apparatus which uses three or less colors, a single color, or five or more colors. Further, the configuration in which the intermediate transfer belt B, which is the intermediate transfer medium, is used is shown as an example of the medium. However, the present invention is not limited thereto. For example, the present invention may be applied to a configuration in which direct transfer is performed on the sheet S, which is provided as an example of the medium, from each of the photoreceptors PRy to PRk.

(H02) In the example, it is possible to arbitrarily change the shown detailed numerical values according to design, specification, or the like. That is, it is possible to arbitrarily change the heating time t1 or the like in accordance with a time required until sensibility is stable according to the characteristics, individual differences, or the like of the imaging elements being used. In addition, it is possible to arbitrarily change the value of the drive voltage or the waiting voltage according to the specification of the imaging elements or the like. In addition, the present invention is not limited to the configuration in which the heating time t1 is determined based on the reading results of the white color reference plate, and, for example, it is possible to set the heating time t1 by directly sensing the temperature of the imaging member CCD.

(H03) In the example, a method of supplying the drive voltage V1 is preferable as a method of heating the imaging member CCD. However, the present invention is not limited thereto. For example, a configuration in which a lot of control signals, such as clock signals, are input or a configuration in which heating is performed using external heat sources are possible.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An image reading apparatus comprising:
a reading member that reads a document on which an image is recorded;
a calibration process section that performs a shading process to correct unevenness in brightness based on a result acquired in such a way that the reading member reads a preset color and that performs a calibration process based on the image which includes a yellow color image; and
a heating control section that heats the reading member during a preset period when power is supplied from a state in which power is not supplied,
the reading member including a reading element that reads the document through a transmission member for transmitting a preset color, for each color, the reading element reading the document through a blue color transmission member.

2. The image reading apparatus according to claim 1, wherein
the heating control section heats the reading member by causing the reading member to be in an operation state.

3. The image reading apparatus according to claim 1, further comprising:
the reading member that reads a preset reference member when power is supplied; and
a period setting section that sets a period in which the reading member is heated based on a result acquired by reading the reference member.

4. An image forming apparatus comprising:
the image reading apparatus according to claim 1 that reads an image from a medium; and
an image recording section that records an image on a medium based on an image which is read by the image reading apparatus.

5. The image forming apparatus according to claim 4, wherein the number of color of the image is arbitrary.

6. An image reading apparatus comprising:
a reading member that reads a document on which an image is recorded and that reads a preset reference member when power is supplied;
a calibration process section that performs a shading process to correct unevenness in brightness based on a result acquired in such a way that the reading member reads a preset color;
a heating control section that heats the reading member during a preset period when power is supplied from a state in which power is not supplied; and
a period setting section that sets a period in which the reading member is heated based on a result acquired by reading the reference member.

7. An image reading apparatus comprising:
a reading member that reads a document on which an image is recorded;
a calibration process section that performs a shading process to correct unevenness in brightness based on a result acquired in such a way that the reading member reads a preset color;
a period setting section that sets a period in which the reading member is heated based on a result acquired by reading a preset reference member using the reading member; and
a heating control section that heats the reading member during a preset period set by the period setting section.

8. The image reading apparatus according to claim 7, wherein
   the heating control section heats the reading member by causing the reading member to be in an operation state.

9. The image reading apparatus according to claim 7, wherein the number of color of the image is arbitrary.

\* \* \* \* \*